US012417512B2

(12) United States Patent
Oh et al.

(10) Patent No.: US 12,417,512 B2
(45) Date of Patent: Sep. 16, 2025

(54) METHOD AND APPARATUS FOR HIGH-RESOLUTION IMAGE OBTAINMENT THROUGH ARTIFICIAL INTELLIGENCE MODEL

(71) Applicant: SAMSUNG ELECTRONICS CO., LTD., Suwon-si (KR)

(72) Inventors: Dongkeun Oh, Suwon-si (KR); Nakhoon Kim, Suwon-si (KR); Hakjae Jeon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 461 days.

(21) Appl. No.: 17/884,250

(22) Filed: Aug. 9, 2022

(65) Prior Publication Data

US 2023/0154132 A1 May 18, 2023

Related U.S. Application Data

(63) Continuation of application No. PCT/KR2022/011711, filed on Aug. 5, 2022.

(30) Foreign Application Priority Data

Aug. 9, 2021 (KR) .................. 10-2021-0104654

(51) Int. Cl.
*G06V 10/24* (2022.01)
*G06T 3/4053* (2024.01)
(Continued)

(52) U.S. Cl.
CPC ............. *G06T 3/4053* (2013.01); *G06T 5/50* (2013.01); *G06T 5/70* (2024.01); *G06T 7/20* (2013.01);
(Continued)

(58) Field of Classification Search
CPC ......... H04N 23/69; G06T 5/70; G06T 3/4053; G06T 5/50; G06T 7/20;
(Continued)

(56) References Cited

U.S. PATENT DOCUMENTS

2015/0022642 A1 1/2015 Appia et al.
2016/0292823 A1 10/2016 Nagumo et al.
(Continued)

FOREIGN PATENT DOCUMENTS

| CN | 106991646 | 7/2017 |
|----|-----------|--------|
| CN | 109559276 | 4/2019 |

(Continued)

OTHER PUBLICATIONS

Ooi, Y. K., & Ibrahim, H. (2021). Deep Learning Algorithms for Single Image Super-Resolution: A Systematic Review. Electronics, 10(7), 867. https://doi.org/10.3390/electronics10070867 (Year: 2021).*

(Continued)

*Primary Examiner* — Matthew C Bella
*Assistant Examiner* — Jinsu Hwang
(74) *Attorney, Agent, or Firm* — Nixon & Vanderhye P.C.

(57) ABSTRACT

An electronic device according to various embodiments of the disclosure may include: a camera module including a camera, a memory, and at least one processor electrically connected to the camera module and the memory, wherein the at least one processor may be configured to: successively obtain a plurality of first images through the camera module, align the plurality of first images, obtain a reference image based on the plurality of aligned first images, and obtain a second image using an artificial intelligence model based on the plurality of aligned first images and the reference image.

10 Claims, 7 Drawing Sheets

803

804

(51) Int. Cl.
*G06T 5/50* (2006.01)
*G06T 5/70* (2024.01)
*G06T 7/20* (2017.01)
*H04N 23/69* (2023.01)

(52) U.S. Cl.
CPC ............ *G06V 10/24* (2022.01); *H04N 23/69* (2023.01); *G06T 2207/20132* (2013.01); *G06T 2207/20182* (2013.01); *G06T 2207/20216* (2013.01); *G06T 2207/30168* (2013.01)

(58) Field of Classification Search
CPC . G06T 2207/20132; G06T 2207/20182; G06T 2207/20216; G06T 2207/30168; G06V 10/24
See application file for complete search history.

(56) References Cited

U.S. PATENT DOCUMENTS

| | | | |
|---|---|---|---|
| 2016/0358314 A1* | 12/2016 | Ji | H04N 19/36 |
| 2020/0242515 A1 | 7/2020 | Reddy et al. | |
| 2020/0302576 A1 | 9/2020 | Xu et al. | |
| 2020/0380641 A1 | 12/2020 | Higaki | |
| 2021/0097646 A1 | 4/2021 | Choi et al. | |
| 2021/0133499 A1 | 5/2021 | Zhang | |
| 2021/0385383 A1 | 12/2021 | Kim et al. | |

FOREIGN PATENT DOCUMENTS

| | | |
|---|---|---|
| JP | 2020-032072 A | 3/2020 |
| JP | 2020-197915 A | 12/2020 |
| KR | 10-2016-0142760 A | 12/2016 |
| KR | 10-2019-0117416 A | 10/2019 |
| KR | 10-2020-0048609 | 5/2020 |
| KR | 10-2169242 B1 | 10/2020 |
| KR | 10-2021-0053121 A | 5/2021 |
| WO | 2018/216207 A1 | 6/2019 |
| WO | 2020/252764 | 12/2020 |

OTHER PUBLICATIONS

Pan, Z., Tan, Z., & Lv, Q. (2021). A Deep Multi-Frame Super-Resolution Network for Dynamic Scenes. Applied Sciences, 11(7), 3285. https://doi.org/10.3390/app11073285 (Year: 2021).*

International Search Report mailed Nov. 4, 2022 issued in International Application No. PCT/KR2022/011711 with English translation (5 pages).

Written Opinion mailed Nov. 4, 2022 issued in International Application No. PCT/KR2022/011711 (4 pages).

Ooi, Yoong Khang et al., "Deep Learning Algorithms for Single Image Super-Resolution: A Systematic Review", Electronics 2021, vol. 10, No. 7, pp. 1-33, Apr. 6, 2021.

Pan, Ze et al., "A Deep Multi-Frame Super-Resolution Network for Dynamic Scenes", Applied Sciences. vol. 11, No. 7, pp. 1-11, Apr. 6, 2021.

B. Wronski et al., "Handheld Multi-Frame Super Resolution", ACM Transactions on Graphics, vol. 38, No. 4, Article 28, Jul. 2019 (SIGGRAPH 2019), 73 pp.

Goutam Bhat et al., "Deep Burst Super-Resolution", Conference: 2021 IEEE/CVF Conference on Computer Vision and Pattern Recognition (CVPR), Apr. 6, 2021, arXiv:2101.10997v2 [cs.CV], 15 pp.

Yulun Zhang et al., "Image Super-Resolution Using Very Deep Residual Channel Attention Networks", European Conference on Computer Vision (ECCV), Jul. 12, 2018, arXiv:1807.02758v2 [cs.CV], 16 pp.

* cited by examiner 801  802

803  804

METHOD AND APPARATUS FOR HIGH-RESOLUTION IMAGE OBTAINMENT THROUGH ARTIFICIAL INTELLIGENCE MODEL

CROSS-REFERENCE TO RELATED APPLICATIONS

This application is a continuation of International Application No. PCT/KR2022/011711 designating the United States, filed on Aug. 5, 2022, in the Korean Intellectual Property Receiving Office and claiming priority to Korean Patent Application No. 10-2021-0104654, filed on Aug. 9, 2021, in the Korean Intellectual Property Office, the disclosures of which are incorporated by reference herein in their entireties.

BACKGROUND

Field

The disclosure relates to a method for providing an image and an electronic device for supporting the same.

Description of Related Art

With the release of a display having a high resolution (e.g., ultra-high definition (UHD)), interest in super-resolution techniques is increasing. The super-resolution technique is a method for converting a low-resolution image into a high-resolution image.

In the super-resolution technique, a plurality of images may be used or a single image may be used. For example, the super-resolution technique includes a pixel shift method for obtaining a high-resolution image from a plurality of low-resolution images obtained by a camera while moving the camera (e.g., an image sensor) at intervals of one pixel or half a pixel and a single image super-resolution (SISR) (also referred to as "single frame super-resolution (SFSR)") method for obtaining one high-resolution image from one low-resolution image.

The pixel shift method requires a component for moving a camera at intervals of one pixel or half a pixel from the aspect of hardware and may thus be difficult to implement in an electronic device (e.g., a smartphone). The SISR method uses one low-resolution image as an input may thus have limitation in obtaining an image having a high resolution from the one low-resolution image.

SUMMARY

Embodiments of the disclosure relate to a method for providing an image and an electronic device for supporting the same, which align a plurality of images obtained through a camera of an electronic device, and obtains a high-resolution image using an artificial intelligence model, based on the plurality of aligned images and a reference image obtained from the plurality of aligned images.

Technical aspects to be achieved in the disclosure are not limited to the technical aspects mentioned above, and other technical aspects not mentioned will be clearly understood by those skilled in the art from the following description.

An electronic device according to various example embodiments of the disclosure may include: a camera module comprising a camera, a memory, and at least one processor electrically connected to the camera module and the memory, wherein the at least one processor may be configured to: successively obtain a plurality of first images through the camera module, align the plurality of first images, obtain a reference image based on the plurality of aligned first images, and obtain a second image using an artificial intelligence model based on the plurality of aligned first images and the reference image.

A method for providing an image by an electronic device according to various example embodiments of the disclosure may include: successively obtaining a plurality of first images through a camera module of the electronic device, aligning the plurality of first images, obtaining a reference image based on the plurality of aligned first images, and obtaining a second image using an artificial intelligence model based on the plurality of aligned first images and the reference image.

A method for providing an image and an electronic device for supporting the same according to various example embodiments of the disclosure may align a plurality of images obtained through a camera of an electronic device and may obtain a high-resolution image using an artificial intelligence model, based on the plurality of aligned images and a reference image obtained from the plurality of aligned images.

Further, a method for providing an image and an electronic device for supporting the same according to various example embodiments of the disclosure may perform training using a low-resolution image and a high-resolution image obtained through an actual camera, thereby improving an artificial intelligence model for providing a super-resolution technique.

In addition, a method for providing an image and an electronic device for supporting the same according to various example embodiments of the disclosure may obtain a high-resolution image in which high-frequency domain data is reconstructed.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
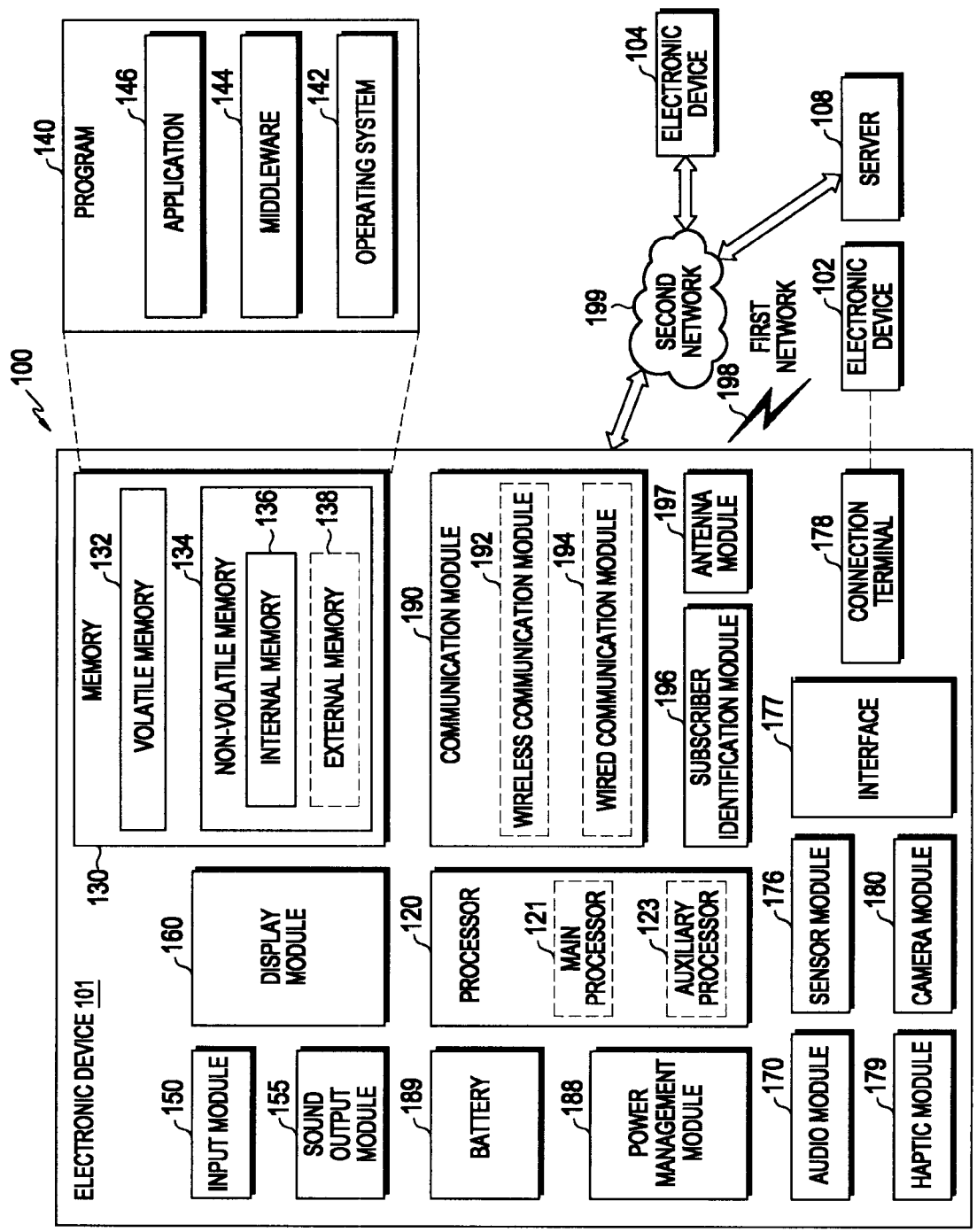
FIG. 1 is a block diagram of an electronic device in a network environment according to various embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
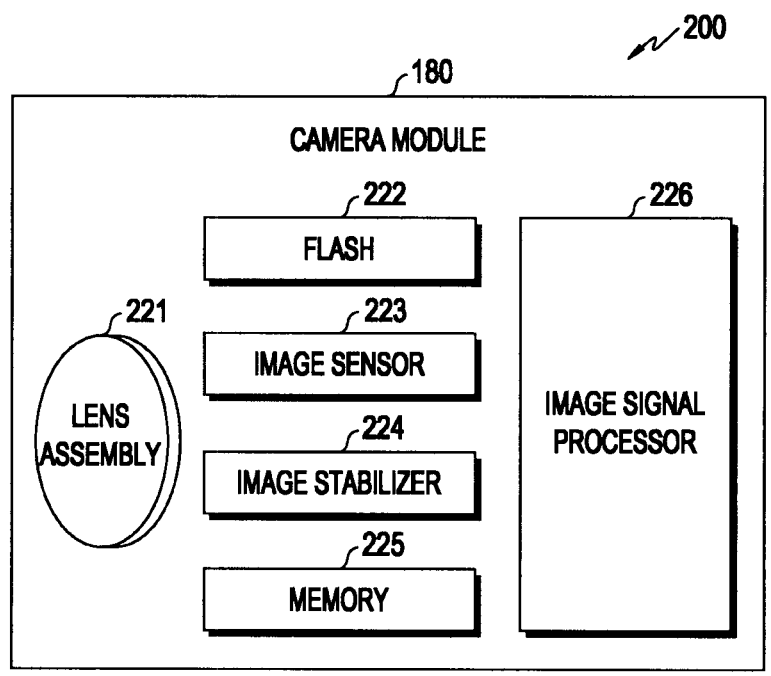
FIG. 2 is a block diagram illustrating a camera module according to various embodiments.

FIG. 2 is a block diagram 200 illustrating the camera module 180 according to various embodiments.

Referring to FIG. 2, the camera module 180 may include a lens assembly 221, a flash 222, an image sensor 223, an image stabilizer 224, memory 225 (e.g., buffer memory), or an image signal processor 226

The lens assembly 221 may collect light emitted or reflected from an object whose image is to be taken. The lens assembly 221 may include one or more lenses. According to an embodiment, the camera module 180 may include a plurality of lens assemblies 221. In such a case, the camera module 180 may form, for example, a dual camera, a 360-degree camera, or a spherical camera. Some of the plurality of lens assemblies 221 may have the same lens attribute (e.g., view angle, focal length, auto-focusing, f number, or optical zoom), or at least one lens assembly may have one or more lens attributes different from those of another lens assembly. The lens assembly 221 may include, for example, a wide-angle lens or a telephoto lens.

The flash 222 may emit light that is used to reinforce light reflected from an object. According to an embodiment, the flash 222 may include one or more light emitting diodes (LEDs) (e.g., a red-green-blue (RGB) LED, a white LED, an infrared (IR) LED, or an ultraviolet (UV) LED) or a xenon lamp. The image sensor 223 may obtain an image corresponding to an object by converting light emitted or reflected from the object and transmitted via the lens assembly 221 into an electrical signal.

According to an embodiment, the image sensor 223 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 223 may be implemented using, for example, a charged coupled device (CCD) sensor or a complementary metal oxide semiconductor (CMOS) sensor.

The image stabilizer 224 may move the image sensor 223 or at least one lens included in the lens assembly 221 in a particular direction, or control an operational attribute (e.g., adjust the read-out timing) of the image sensor 223 in response to the movement of the camera module 180 or the electronic device 101 including the camera module 180. This allows compensating for at least part of a negative effect (e.g., image blurring) by the movement on an image being captured. According to an embodiment, the image stabilizer 224 may sense such a movement by the camera module 180 or the electronic device 101 using a gyro sensor (not shown) or an acceleration sensor (not shown) disposed inside or outside the camera module 180. According to an embodiment, the image stabilizer 224 may be implemented, for example, as an optical image stabilizer.

The memory 225 may store, at least temporarily, at least part of an image obtained via the image sensor 223 for a subsequent image processing task. For example, if image capturing is delayed due to shutter lag or multiple images are quickly captured, a raw image obtained (e.g., a Bayer-patterned image, a high-resolution image) may be stored in the memory 225, and its corresponding copy image (e.g., a low-resolution image) may be previewed via the display module 160. Thereafter, if a specified condition is met (e.g., by a user's input or system command), at least part of the raw image stored in the memory 225 may be obtained and processed, for example, by the image signal processor 226. According to an embodiment, the memory 225 may be configured as at least part of the memory 130 or as a separate memory that is operated independently from the memory 130.

The image signal processor 226 may perform one or more image processing with respect to an image obtained via the image sensor 223 or an image stored in the memory 225. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 226 may perform control (e.g., exposure time control or read-out timing control) with respect to at least one (e.g., the image sensor 223) of the components included in the camera module 180. An image processed by the image signal processor 226 may be stored back in the memory 225 for further processing, or may be provided to an external component (e.g., the memory 130, the display module 160, the electronic device 102, the electronic device 104, or the server 108) outside the camera module 180. According to an embodiment, the image signal processor 226 may be configured as at least part of the processor 120, or as a separate processor that is operated independently from the processor 120. If the image signal processor 226 is configured as a separate processor from the processor 120, at least one image processed by the image signal processor 226 may be displayed, by the processor 120, via the display module 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules may form, for example, a front camera and at least another of the plurality of camera modules may form a rear camera.

Figure 3:
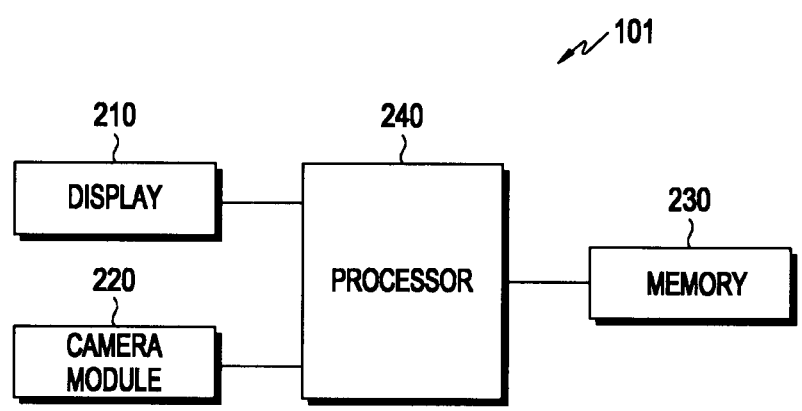
FIG. 3 is a block diagram illustrating an example configuration of an electronic device according to various embodiments.

FIG. 3 is a block diagram illustrating an example configuration of an electronic device 101 according to various embodiments.

Referring to FIG. 3, in an embodiment, the electronic device 101 may include a display 210, a camera module (e.g., a camera module including a camera) 220, a memory 230, and/or a processor (e.g., a processor including processing circuitry) 240.

In an embodiment, the display 210 may be included in the display module 160 of FIG. 1.

In an embodiment, the display 210 may display an image obtained through the camera module 220. For example, the display 210 may display a plurality of images successively obtained through the camera module 220. In another example, when a plurality of images successively obtained through the camera module 220 is processed, the display 210 may display the images obtained through processing.

In an embodiment, the camera module 220 may be included in the camera module 180 of FIG. 1 and FIG. 2.

In an embodiment, the camera module 220 may include a camera and successively obtain a plurality of images. The plurality of successively obtained images may be images having different views (e.g., images having mutual parallax).

In an embodiment, the memory 230 may be included in the memory 130 of FIG. 1.

In an embodiment, the memory 230 may include components for performing at least part of an operation of providing an image.

In an embodiment, the processor 240 may be included in the processor 120 of FIG. 1.

In an embodiment, the processor 240 may include various processing circuitry and control the overall operation of providing the image. In an embodiment, the processor 240 may include one or more processors for performing the operation of providing the image.

In an embodiment, although FIG. 3 shows that the electronic device 101 includes the display 210, the camera module 220, the memory 230, and/or the processor 240, but the disclosure is not limited thereto. For example, the electronic device 101 may not include the display 210 according to an embodiment. In another example, the electronic device 101 may further include at least one component (e.g., the communication module 190) among the components of the electronic device 101 illustrated in FIG. 1.

Figure 4:
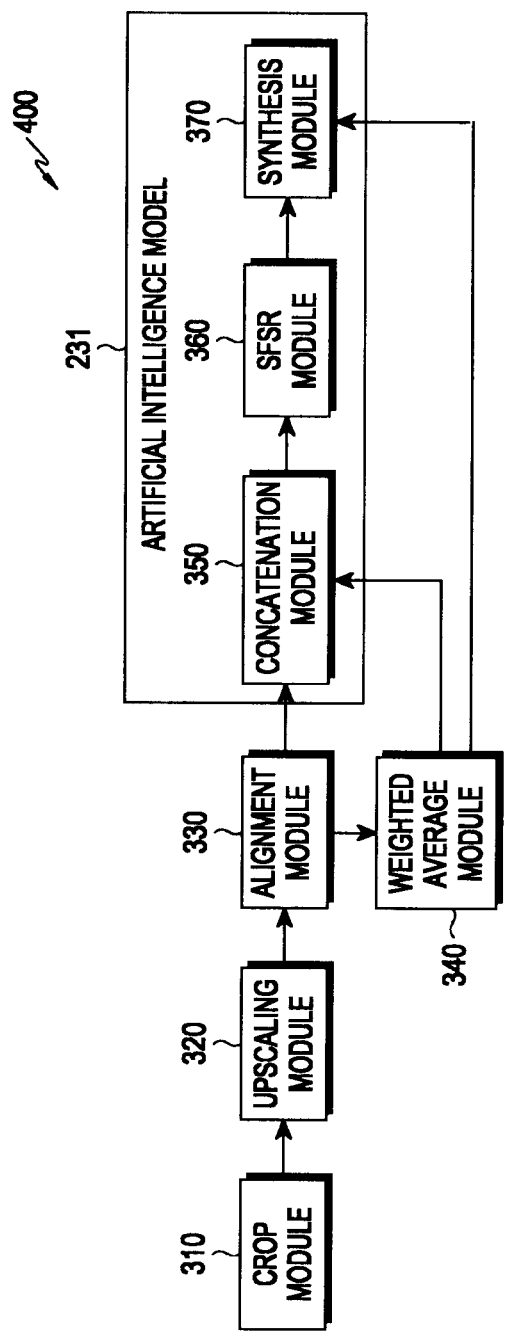
FIG. 4 is a block diagram illustrating example components for performing an operation of providing an image according to various embodiments.

FIG. 4 is a block diagram 400 illustrating example components for performing an operation of providing an image according to various embodiments.

Referring to FIG. 4, in an embodiment, the components for performing the operation of providing the image may include a crop module (e.g., a crop module including various processing circuitry and/or executable program instructions) 310, an upscaling module (e.g., an upscaling module including various processing circuitry and/or executable program instructions) 320, an alignment module (e.g., an alignment module including various processing circuitry and/or executable program instructions) 330, a weighted average module (e.g., a weighted average module including various processing circuitry and/or executable program instructions) 340, and/or an artificial intelligence model (e.g., an artificial intelligence model including various processing circuitry and/or executable program instructions) 231. In an embodiment, the crop module 310, the upscaling module 320, the alignment module 330, the weighted average module 340, and/or the artificial intelligence model 231 may be stored in a memory 230.

In an embodiment, the artificial intelligence model 231 may include a concatenation module (e.g., a concatenation module including various processing circuitry and/or executable program instructions) 350, a single frame super-resolution (SFSR) module (e.g., a SFSR module including various processing circuitry and/or executable program instructions) 360, and/or a synthesis module (e.g., a synthesis module including various processing circuitry and/or executable program instructions) 370. However, the disclosure is not limited thereto, and at least one of the concatenation module 350, the single frame super-resolution (SFSR) module 360, and the synthesis module 370 may be configured using a designated algorithm without using artificial intelligence.

In an embodiment, at least one of the crop module 310, the upscaling module 320, the alignment module 330, or the weighted average module 340 may be included in the artificial intelligence model 231.

In an embodiment, the crop module 310 may crop a plurality of images (which may be referred to hereinafter as "a plurality of first images") successively obtained through a camera module 220. In an embodiment, when a zoom input (e.g., a zoom-in input) associated with the camera module 220 is received from a user, the crop module 310 may crop the plurality of first images, based on zoom magnification associated with the camera module 220. For example, when an input to increase the zoom magnification twice from a zoom magnification of 1.0× to a zoom magnification of 2.0×, the crop module 310 may crop a ¼ area of each image of the plurality of first images, obtained through the entire area of an image sensor of the camera module 220 (or an area of the image sensor corresponding to a currently displayed image), based on the center of the image (or the center of the image being currently displayed through a display 210). In an embodiment, the crop module 310 may transmit a plurality of cropped first images (hereinafter, referred to as "a plurality of cropped first images") to the upscaling module 320.

In an embodiment, the upscaling module 312 may perform an operation of upscaling the plurality of cropped first images.

In an embodiment, the upscaling module 320 may upscale the plurality of cropped first images into a plurality of images (which may be referred to hereinafter as "a plurality of upscaled first images") having a greater size than the size of the plurality of cropped first images.

In an embodiment, the upscaling module 320 may perform the operation of upscaling the plurality of cropped first images, based on the zoom magnification associated with the camera module 220. For example, when the ¼ area of each image of the plurality of first images based on the center of the image is cropped based on receiving the input to increase the zoom magnification twice from a zoom magnification of 1.0× to a zoom magnification of 2.0×, the upscaling module 320 may upscale the plurality of cropped first images having a first size into the plurality of upscaled first images having a second size four times (e.g., twice in width and twice in length) greater than the first size.

In an embodiment, the upscaling module 320 may perform the operation of upscaling the plurality of cropped first images using various algorithms. For example, the upscaling module 320 may perform the operation of upscaling the plurality of cropped first images using a nearest neighbor algorithm, a bicubic algorithm, or a bilinear algorithm. However, an algorithm used by the upscaling module 320 to perform the operation of upscaling the plurality of cropped first images is not limited to the foregoing algorithms.

In an embodiment, the upscaling module 320 may not be included in a processor 240, in which case an upscaling operation may be performed in the artificial intelligence model 231 (e.g., the SFSR module 360).

In an embodiment, the alignment module 330 may align the plurality of upscaled first images.

In an embodiment, the alignment module 330 may align, based on one image among the plurality of upscaled first images (e.g., the position of the one image among the plurality of upscaled first images), images (e.g., the positions of the images) other than the one image as a reference among the plurality of upscaled first images. Hereinafter, a method in which the alignment module 330 aligns the plurality of upscaled first images will be described in greater detail below with reference to FIG. 5.

Figure 5:
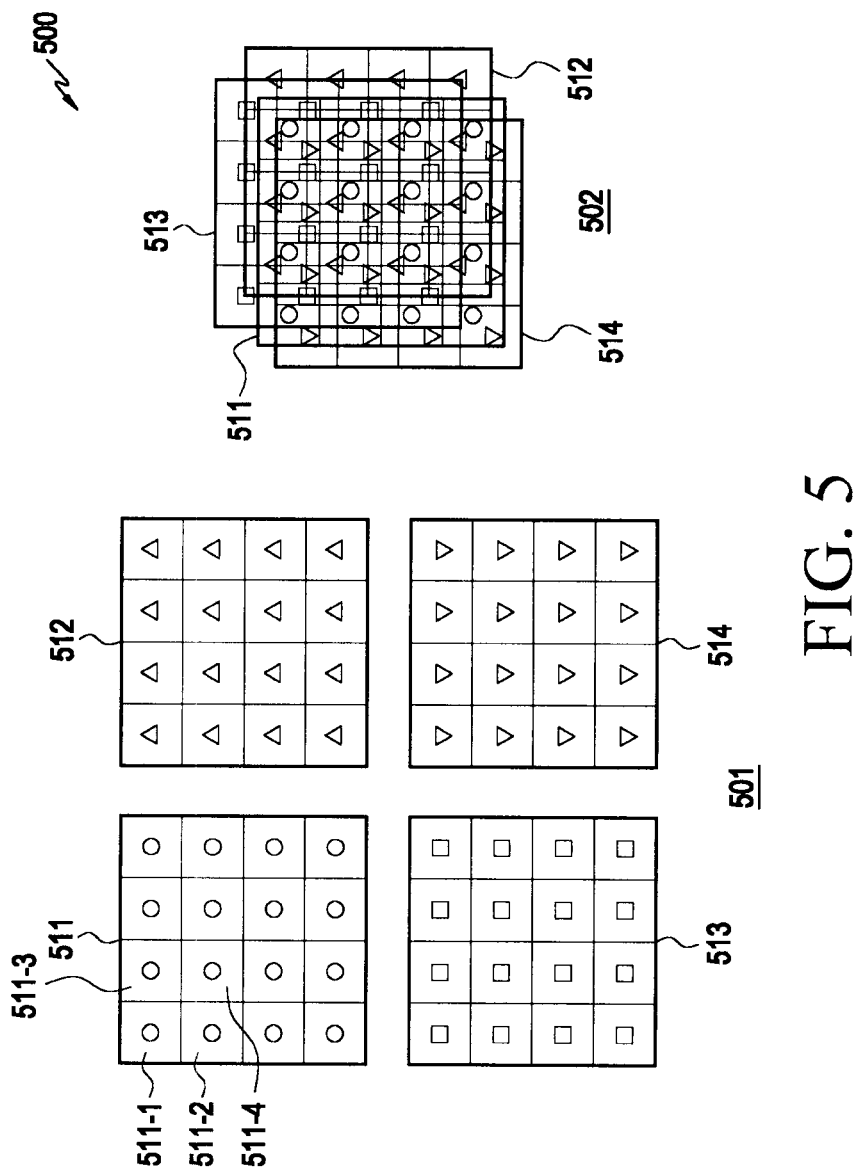
FIG. 5 is a diagram illustrating an example method for aligning a plurality of images according to various embodiments.

FIG. 5 is a diagram 500 illustrating an example method for aligning a plurality of images according to various embodiments.

Referring to FIG. 5, in an embodiment, reference numeral 501 may denote a plurality of upscaled first images. For example, the plurality of upscaled first images may include image 1 511, image 2 512, image 3 513, and image 4 514. Reference numeral 501 shows four upscaled first images as the plurality of upscaled first images, but is not limited thereto. In an embodiment, referring to reference numeral 501 and reference numeral 502, image 1 511, image 2 512, image 3 513, and image 4 514 may be images each having a Bayer pattern. For example, in image 1 511, a first pixel 511-1 may be a pixel corresponding to red of RGB, a second pixel 511-2 and a third pixel 511-3 may be pixels corresponding to green of RGB, and a fourth pixel 511-4 may be a pixel corresponding to blue of RGB. However, the disclosure is not limited thereto, and the plurality of upscaled first images may be images having RGB data.

In an embodiment, the alignment module 330 may obtain information about a movement of the camera module 220 while successively obtaining a plurality of first images through the camera module 220. For example, the alignment module 330 may obtain (e.g., calculate) differences between a position of the camera module 220 at which a first image among the plurality of first images (e.g., an image obtained first among the plurality of first images) is obtained and positions of the camera module 220 at which images after the first image (e.g., images obtained after the first image is obtained) are obtained while successively obtaining the plurality of first images through the camera module 220. In an embodiment, the alignment module 330 may obtain the information about the movement of the camera module 220 by comparing pixel values of the first image and pixel values of each of the images after the first image while successively obtaining the plurality of first images through the camera module 220.

In an embodiment, the alignment module 330 may align the plurality of scaled first images, based on the obtained information about the movement of the camera module 220. For example, as shown by reference numeral 502, the alignment module 330 may align, based on one image (e.g., the image 511) among the plurality of scaled first images, images (e.g., the images 512, 513, and 514) other than the one image as a reference. In an embodiment, the alignment module 330 may shift the positions of the other images, based on the position of the one image as the reference among the plurality of scaled first images, based on the obtained information about the movement of the camera module 220, thereby aligning the plurality of upscaled first images (hereinafter, the one image as the reference and the other images after the alignment are referred to as "a plurality of aligned first images"). In an embodiment, the alignment module 330 may transmit the plurality of aligned first images to the artificial intelligence model 231 (e.g., the concatenation module 350).

In an embodiment, the weighted average module 340 may average the plurality of aligned first images in view of a weight. For example, the weighted averaging module 340 may assign a weight to each of the plurality of aligned first images, based on the quality of each of the plurality of aligned first images (e.g., the degree to which each of the plurality of aligned first images is blurred and/or the peak signal-to-noise ratio (PSNR) of each of the plurality of aligned first images). Weights assigned to the plurality of aligned first images may be the same or different.

In an embodiment, the weighted average module 340 may average the plurality of aligned first images (e.g., pixel values of each of the plurality of aligned first images), based on the weights assigned to the plurality of aligned first images, thereby obtaining one image (hereinafter, referred to as a "reference image").

In an embodiment, the reference image may be an image in which the strength of an original signal (e.g., a pattern of each of the plurality of aligned first images) is increased in a high-frequency region and the strength of noise is reduced, compared to the plurality of aligned first images. In an embodiment, the reference image may be an image including data of the high-frequency region that is not included in the plurality of aligned first images. In an embodiment, the reference image may be an image including less noise (e.g., a Moiré signal) than the plurality of aligned first images. In an embodiment, the reference image may be an image from which at least part of noise included in the plurality of aligned first images is removed. In an embodiment, the reference image may be an image generated based on at least a portion of each of the plurality of aligned first images.

In an embodiment, the weighted average module 340 may average all of the plurality of aligned first images or some images of the plurality of aligned first images in view of the weights. In an embodiment, the weighted average module 340 may transmit the reference image to the artificial intelligence model 231 (e.g., the concatenation module 350).

In an embodiment, the concatenation module 350 may obtain the plurality of aligned first images from the alignment module 330, and may obtain the reference image from the weighted average module 340. In an embodiment, the concatenation module 350 may convert the plurality of aligned first images and the reference image into one image. For example, the plurality of aligned first images and the reference image may each have a red channel, a green channel, and a blue channel. The concatenation module 350 may obtain one image having the channels of the plurality of aligned first images and the channels of the reference image from the plurality of aligned first images and the reference image.

In an embodiment, the SFSR module 360 (also referred to as an "SFSR artificial intelligence model") may output an image in which noise (e.g., a Moiré signal) is reduced (or removed) and data of the high-frequency region is restored as result data using the image converted from the plurality of aligned first images and the reference image as input data. For example, the SFSR module 360 may output an image in which each pixel to form the image has a red value, a green value, and a blue value, based on the one image having the channels of the plurality of aligned first images and the channels of the reference image, similarly to the foregoing pixel shifting.

In an embodiment, the SFSR module 360 may include an artificial intelligence model using, for example, very deep residual channel attention networks (RCAN). The RCAN may include a convolution layer for extracting a feature (e.g., a shallow feature) of input data, a skip connection (e.g., a long skip connection), a plurality of residual groups, and convolution layers for extracting a feature (e.g., a deep feature) from resulting data of the residual groups. Each residual group of the RCAN may include a plurality of channel attention blocks, a skip connection (e.g., a short skip connection), and a convolution layer, respectively. However, an artificial intelligence network used by the SFSR module 360 is not limited to the RCAN, and various artificial intelligence networks may be used. For example, the SFSR module 360 may use an SRCNN, an FSRCNN, an ESPCN, or a VDSR.

In an embodiment, the synthesis module 370 may obtain a final image (also referred to as a "second image"), based on the image output from the artificial intelligence model 231 and the reference image input from the weighted average module 340. In an embodiment, the second image may be an image in which noise (e.g., a Moiré signal) existing in the plurality of first images (e.g., aligned first images) or the reference image is reduced by cancelation and the data in the high-frequency region is amplified.

Although FIG. 4 shows that the artificial intelligence model 231 include the SFSR module 360, the disclosure is not limited thereto. In an embodiment, the artificial intelligence model 231 may include a denoising artificial intelligence model (e.g., a denoising CNN model) in addition to or in place of the SFSR module 360. When the artificial intelligence model 231 uses the denoising artificial intelligence model 231, noise may be removed from an image, thus obtaining an image having an improved image quality.

An electronic device according to various example embodiments of the disclosure may include a camera module including a camera, a memory, and at least one processor electrically connected to the camera module and the memory, wherein the at least one processor may be configured to successively obtain a plurality of first images through the camera module, align the plurality of first images, obtain a reference image based on the plurality of aligned first images, and obtain a second image using an artificial intelligence model based on the plurality of aligned first images and the reference image.

In various example embodiments, the at least one processor may be configured to obtain the reference image by performing a weighted average operation on the plurality of aligned first images.

In various example embodiments, the second image may have a higher resolution than a resolution of the plurality of first images.

In various example embodiments, the at least one processor may be configured to: crop the plurality of first images, upscale the plurality of cropped first images, and align the plurality of upscaled first images.

In various example embodiments, the at least one processor may be configured to: crop the plurality of first images based on receiving an input to increase a zoom magnification associated with the camera module, and upscale the plurality of cropped first images based on the zoom magnification.

In various example embodiments, the reference image may include an image in which a strength of an original signal is increased in a high-frequency region and a strength of noise is reduced compared to the plurality of upscaled first images.

In various example embodiments, the at least one processor may be configured to: obtain information about a movement of the camera module while successively obtaining the plurality of first images through the camera module, and align the plurality of first images based on the information about the movement of the camera module.

In various example embodiments, the at least one processor may be configured to: assign a weight to each of the plurality of aligned first images based on a quality of each of the plurality of aligned first images, and perform an operation of averaging the plurality of aligned first images based on the weight.

In various example embodiments, the artificial intelligence model may include a single frame super-resolution (SFSR) artificial intelligence model and a denoising artificial intelligence model.

Figure 6:
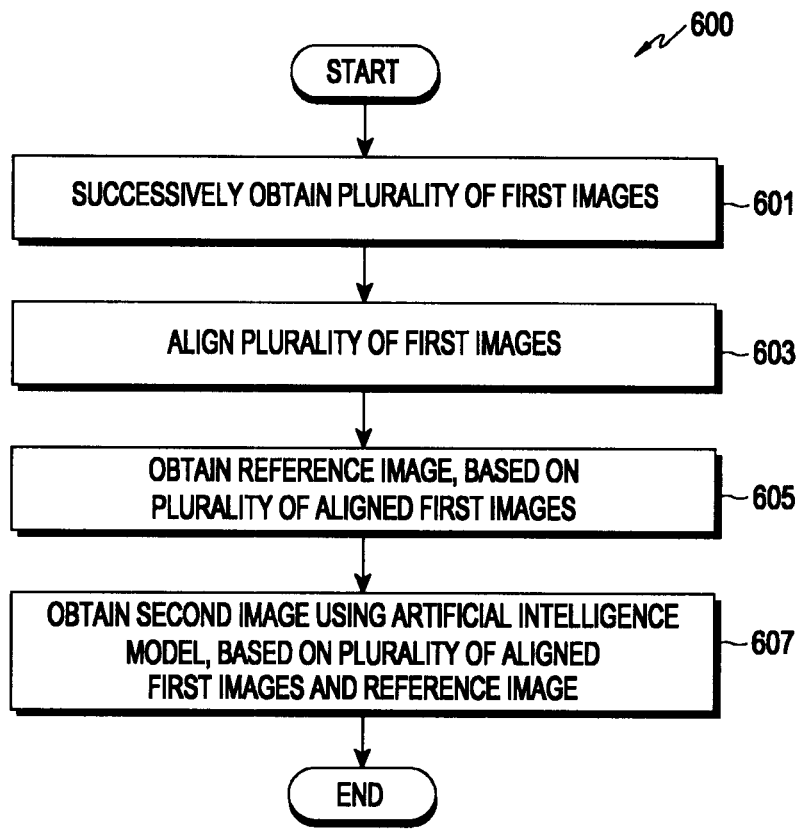
FIG. 6 is a flowchart illustrating an example method for providing an image according to various embodiments.

FIG. 6 is a flowchart 600 illustrating an example method for providing an image according to various embodiments.

Referring to FIG. 6, in operation 601, in an embodiment, a processor 240 may successively obtain a plurality of first images through a camera module 220.

In operation 603, in an embodiment, the processor 240 may align the plurality of obtained first images.

In an embodiment, the processor 240 may align, based on one image among the plurality of first images, images (e.g., the positions of the images) other than the one image as a reference among the plurality of first images.

In an embodiment, the processor 240 may obtain information about a movement of a camera module 220 while successively obtaining a plurality of first images through the camera module 220. For example, the processor 240 may obtain (e.g., calculate) differences between a position of the camera module 220 at which a first image among the plurality of first images (e.g., an image obtained first among the plurality of first images) is obtained and positions of the camera module 220 at which images after the first image (e.g., images obtained after the first image is obtained) are obtained while successively obtaining the plurality of first images through the camera module 220. In an embodiment, the processor 240 may obtain the information about the movement of the camera module 220 by comparing pixel values of the first image and pixel values of each of the images after the first image while successively obtaining the plurality of first images through the camera module 220.

In an embodiment, the processor 240 may align the plurality of first images, based on the obtained information about the movement of the camera module 220.

In an embodiment, the processor 240 may shift the positions of the other images, based on the position of the one image as a reference among the plurality of first images, based on the obtained information about the movement of the camera module 220, thereby aligning the plurality of first images In operation 605, in an embodiment, the processor 240 may obtain a reference image based on the plurality of aligned first images.

In an embodiment, the processor 240 may average the plurality of aligned first images in view of a weight. For example, the processor 240 may assign a weight to each of the plurality of aligned first images, based on the quality of each of the plurality of aligned first images (e.g., the degree to which each of the plurality of aligned first images is blurred and/or the peak signal-to-noise ratio (PSNR) of each of the plurality of aligned first images). Weights assigned to the plurality of aligned first images may be the same or different. However, a method for obtaining the reference image based on the plurality of aligned first images is not limited to the foregoing example. The processor 240 may obtain the reference image using a median of the plurality of aligned first images.

In an embodiment, the processor 240 may average the plurality of aligned first images (e.g., pixel values of each of the plurality of aligned first images) in view of the weights assigned to the plurality of aligned first images, thereby obtaining the reference image.

In an embodiment, the reference image may be an image in which the strength of an original signal (e.g., a pattern of each of the plurality of aligned first images) is increased in a high-frequency region and the strength of a noise signal is reduced, compared to the plurality of aligned first images. In an embodiment, the reference image may be an image including data of the high-frequency region that is not included in the plurality of aligned first images. In an embodiment, the reference image may be an image including less noise (e.g., a Moiré signal) than the plurality of aligned first images. In an embodiment, the reference image may be an image from which at least part of noise included in the plurality of aligned first images is removed. In an embodiment, the reference image may be an image generated based on at least a portion of each of the plurality of aligned first images.

In an embodiment, the processor 240 may average all of the plurality of aligned first images or some images of the plurality of aligned first images in view of the weights. In an embodiment, a weighted average module 340 may transmit the reference image to an artificial intelligence model 231 (e.g., a concatenation module 350).

In operation 607, in an embodiment, the processor 240 may obtain a second image (e.g., final image) using the artificial intelligence model 231, based on the plurality of aligned first images and the reference image.

In an embodiment, the processor 240 may convert the plurality of aligned first images and the reference image into one image using the artificial intelligence model 231. For example, the plurality of aligned first images and the reference image may each have a red channel, a green channel, and a blue channel. The processor 240 may obtain one image having the channels of the plurality of aligned first images and the channels of the reference image from the plurality of aligned first images and the reference image using the artificial intelligence model 231.

In an embodiment, the processor 240 may output, using the artificial intelligence model 231 (e.g., an SFSR module 360), an image in which noise (e.g., a Moiré signal) is reduced (or removed) and data of the high-frequency region is restored as result data using the image converted from the plurality of aligned first images and the reference image as input data. For example, the processor 240 may output, using the artificial intelligence model 231 (e.g., an SFSR module 360), an image in which each pixel to form the image has a red value, a green value, and a blue value, based on the one image having the channels of the plurality of aligned first images and the channels of the reference image, similarly to the foregoing pixel shifting.

In an embodiment, the SFSR module 360 may be an artificial intelligence model using, for example, very deep residual channel attention networks (RCAN). The RCAN may include a convolution layer for extracting a feature (e.g., a shallow feature) of input data, a skip connection (e.g., a long skip connection), a plurality of residual groups, and convolution layers for extracting a feature (e.g., a deep feature) from resulting data of the residual groups. Each residual group of the RCAN may include a plurality of channel attention blocks, a skip connection (e.g., a short skip connection), and a convolution layer, respectively. However, an artificial intelligence network used by the SFSR module 360 is not limited to the RCAN, and various artificial intelligence networks may be used. For example, the SFSR module 360 may use an SRCNN, an FSRCNN, an ESPCN, or a VDSR.

In an embodiment, the artificial intelligence model 231 may include a denoising artificial intelligence model (e.g., a denoising CNN model) in addition to or in place of the SFSR module 360. When the artificial intelligence model 231 uses the denoising artificial intelligence model 231, noise may be removed from an image, thus obtaining the image having an improved image quality.

In an embodiment, the processor 240 may obtain the second image, based on the image output from the artificial intelligence model 231 and the reference image. In an embodiment, the processor 240 may obtain the second image, based on the image output from the artificial intelligence model 231 and the reference image, using the artificial intelligence model 231.

In an embodiment, the second image may be an image in which noise (e.g., a Moiré signal) existing in the plurality of first images (e.g., aligned first images) or the reference image is reduced by cancelation and the data in the high-frequency region is amplified.

Although FIG. 6 shows that the processor 240 aligns the plurality of first images and performs a weighted average operation on the plurality of aligned first images without using the artificial intelligence model 231 to thereby obtain the reference image, the disclosure is not limited thereto. For example, the processor 240 may perform an operation of aligning the plurality of first images and/or a weighted average operation on the plurality of aligned first images using the artificial intelligence model 231.

Figure 7:
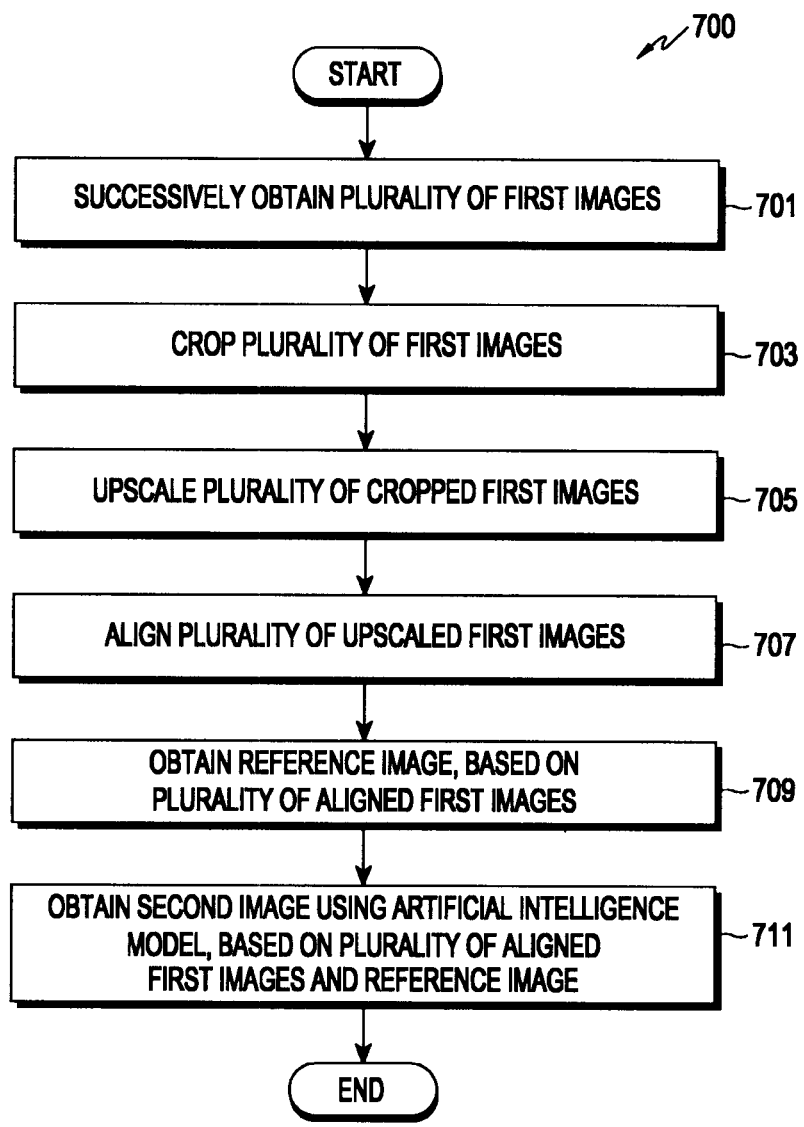
FIG. 7 is a flowchart illustrating an example method for providing an image according to various embodiments.

FIG. 7 is a flowchart 700 illustrating an example method for providing an image according to various embodiments.

Referring to FIG. 7, in operation 701, in an embodiment, a processor 240 may successively obtain a plurality of first images through a camera module 220.

In operation 703, in an embodiment, the processor 240 may crop the plurality of first images. In an embodiment, the processor 240 may crop the plurality of first images. In an embodiment, when a zoom input (e.g., a zoom-in input) associated with the camera module 220 is received from a user, the processor 240 may crop the plurality of first images, based on zoom magnification associated with the camera module 220. For example, when an input to increase the zoom magnification twice from a zoom magnification of 1.0× to a zoom magnification of 2.0×, the processor 240 may crop a ¼ area of each image of the plurality of first images, obtained through the entire area of an image sensor of the camera module 220 (or an area of the image sensor corresponding to a currently displayed image), based on the center of the image (or the center of the image being currently displayed through a display 210).

In operation 705, in an embodiment, the processor 240 may upscale the plurality of cropped first images.

In an embodiment, the processor 240 may upscale the plurality of cropped first images into a plurality of images having a greater size than the size of the plurality of cropped first images.

In an embodiment, the processor 240 may perform the operation of upscaling the plurality of cropped first images, based on the zoom magnification associated with the camera module 220. For example, when the ¼ area of each image of the plurality of first images based on the center of the image is cropped based on receiving the input to increase the zoom magnification twice from a zoom magnification of 1.0× to a zoom magnification of 2.0×, the processor 240 may upscale the plurality of cropped first images having a first size into the plurality of scaled first images having a second size four times (e.g., twice in width and twice in length) greater than the first size.

In an embodiment, the processor 240 may perform the operation of upscaling the plurality of cropped first images using various algorithms. For example, the processor 240 may perform the operation of upscaling the plurality of cropped first images using a nearest neighbor algorithm, a bicubic algorithm, or a bilinear algorithm. However, an algorithm used by the processor 240 to perform the operation of upscaling the plurality of cropped first images is not limited to the foregoing algorithms.

In an embodiment, the processor 240 may perform an upscaling operation using an artificial intelligence model 231.

In operation 707, in an embodiment, the processor 240 may align the plurality of upscaled first images.

In operation 709, in an embodiment, the processor 240 may obtain a reference image, based on the plurality of aligned first images.

In operation 711, in an embodiment, a second image (e.g., final image) may be obtained using the artificial intelligence model 231, based on the plurality of aligned first images and the reference image.

Since operation 707 to operation 709 are at least partially the same as or similar to operation 603 to operation 607, a detailed description thereof may not be repeated.

Figure 8A:
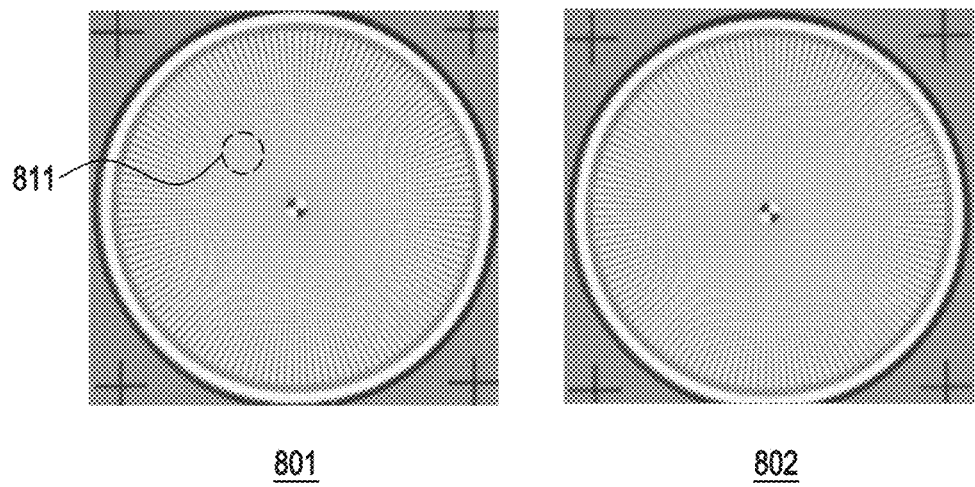
FIG. 8A is a diagram illustrating an example method for aligning a plurality of images according to various embodiments.

FIG. 8A is a diagram illustrating an example method for aligning a plurality of images according to various embodiments.

Figure 8B:
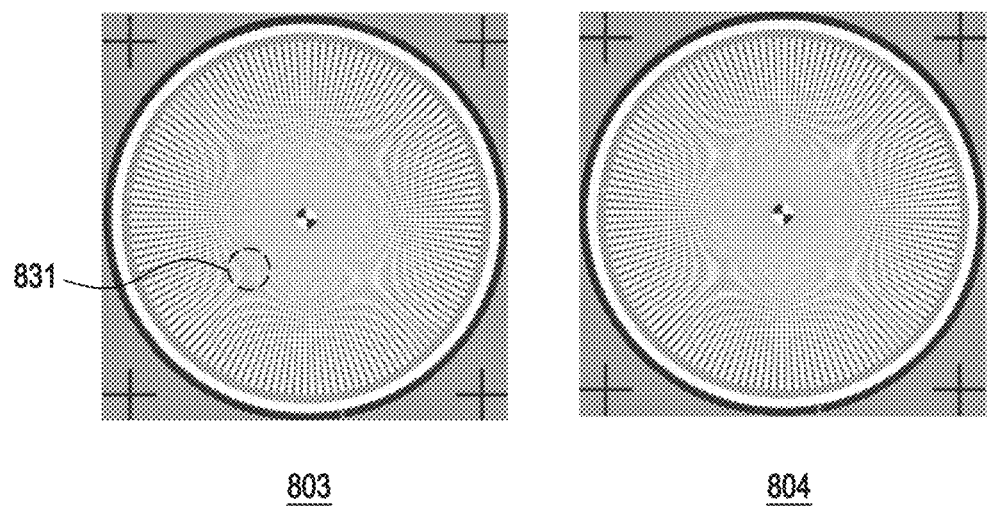
FIG. 8B is a diagram illustrating an example method for aligning a plurality of images according to various embodiments.

FIG. 8B is a diagram illustrating an example method for aligning a plurality of images according to various embodiments.

Referring to FIG. 8A and FIG. 8B, in an embodiment, reference numeral 801 may denote one image among a plurality of upscaled (e.g., upscaled by a bicubic method) first images. As shown by reference numeral 801, the one image among the plurality of upscaled first images includes noise 811 (e.g., a Moiré signal) but may not include data of a high-frequency region in some areas.

In an embodiment, reference numeral 802 may denote a reference image. Comparing reference numeral 801 and reference numeral 802, the reference image may have reduced noise strength compared to the upscaled first image and may include the data in the high-frequency region that is not included in the upscaled first image.

In an embodiment, reference numeral 803 may denote a final image obtained using an artificial intelligence model 231, based on a plurality of aligned first images and one image among the plurality of aligned first images in place of the reference image. As shown by reference numeral 803, the obtained final image includes noise 831, and the data in the high-frequency region has not been restored in some areas of the obtained image.

In an embodiment, reference numeral 804 may denote a second image. In the second image of reference numeral 804 compared with reference numerals 801 to 803, the strength of noise is significantly reduced and the data of the high-frequency region has been restored.

A method for providing an image by an electronic device according to various example embodiments of the disclosure may include: successively obtaining a plurality of first images through a camera module of the electronic device, aligning the plurality of first images, obtaining a reference image based on the plurality of aligned first images, and obtaining a second image using an artificial intelligence model based on the plurality of aligned first images and the reference image.

In various example embodiments, the obtaining of the reference image may include obtaining the reference image by performing a weighted average operation on the plurality of aligned first images.

In various example embodiments, the second image may have a higher resolution than a resolution of the plurality of first images.

In various example embodiments, the method may further include cropping the plurality of first images and upscaling the plurality of cropped first images, and the aligning of the plurality of first images may include aligning the plurality of upscaled first images.

In various example embodiments, the cropping of the plurality of first images may include cropping the plurality of first images based on receiving an input to increase the zoom magnification associated with the camera module, and the upscaling of the plurality of cropped first images may include upscaling the plurality of cropped first images, based on the zoom magnification.

In various example embodiments, the reference image may include an image in which a strength of an original signal is increased in a high-frequency region and a strength of noise is reduced compared to the plurality of upscaled first images.

In various example embodiments, the aligning of the plurality of first images may include: obtaining information about a movement of the camera module while successively obtaining the plurality of first images through the camera module, and aligning the plurality of first images based on the information about the movement of the camera module.

In various example embodiments, the obtaining of the reference image may include: assigning a weight to each of the plurality of aligned first images based on a quality of each of the plurality of aligned first images, and performing an operation of averaging the plurality of aligned first images, based on the weight.

In various example embodiments, the artificial intelligence model may include an SFSR artificial intelligence model and a denoising artificial intelligence model.

In various example embodiments, the obtaining of the reference image may include obtaining the reference image using the artificial intelligence model.

The structure of data used in the foregoing embodiments of the disclosure may be recorded in a non-transitory computer-readable recording medium through various methods. The computer-readable recording medium includes a storage medium, such as a magnetic storage medium (e.g., ROM, floppy disk, and hard disk) and an optical reading medium (e.g., CD-ROM and DVD).

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
a camera module including a camera;
a memory; and
at least one processor, comprising processing circuitry, electrically connected to the camera module and the memory,
wherein the at least one processor is individually and/or collectively configured to:
successively obtain a plurality of first images through the camera module,
obtain information about a movement of the camera module while successively obtaining the plurality of first images through the camera module, wherein the information about the movement of the camera module includes differences between a first position of the camera module at which a beginning image among the plurality of first images is obtained and second positions of the camera module at which images after the beginning image are obtained, wherein the information about the movement of the camera module is obtained by comparing a first pixel value of the beginning image and second pixel values of each of the images after the beginning image, based on receiving an input to increase a zoom magnification associated with the camera module, crop the plurality of first images, upscale the plurality of cropped first images based on the zoom magnification, based on the information about the movement of the camera module, align the plurality of upscaled first images, by shifting positions of the images after the beginning image, other than the beginning image, with respect to the first position of the camera module as a reference, based on the plurality of aligned first images, obtain a reference image by performing a weighted average operation on the plurality of aligned first images, wherein the reference image includes an image in which a strength of an original signal is increased in a high-frequency region and a strength of noise is reduced compared to the plurality of upscaled first images, and obtain a second image using an artificial intelligence model based on the plurality of aligned first images and the reference image.

2. The electronic device of claim 1, wherein the second image has a higher resolution than a resolution of the plurality of first images.

3. The electronic device of claim 1, wherein the at least one processor is configured to:
assign a weight to each of the plurality of aligned first images based on a quality of each of the plurality of aligned first images, and
perform an operation of averaging the plurality of aligned first images based on the weight.

4. The electronic device of claim 1, wherein the artificial intelligence model comprises a single frame super-resolution (SFSR) artificial intelligence model and a denoising artificial intelligence model.

5. The electronic device of claim 1, wherein the at least one processor is configured to obtain the reference image using the artificial intelligence model.

6. A method for providing an image by an electronic device, the method comprising:
successively obtaining a plurality of first images through a camera module of the electronic device;
obtaining information about a movement of the camera module while successively obtaining the plurality of first images through the camera module, wherein the information about the movement of the camera module includes differences between a first position of the camera module at which a beginning image among the plurality of first images is obtained and second positions of the camera module at which images after the beginning image are obtained, wherein the information about the movement of the camera module is obtained by comparing a first pixel value of the beginning image and second pixel values of each of the images after the beginning image, based on receiving an input to increase a zoom magnification associated with the camera module, cropping the plurality of first images, upscaling the plurality of cropped first images based on the zoom magnification, based on the information about the movement of the camera module, aligning the plurality of upscaled first images, by shifting positions of the images after the beginning image, other than the beginning image, with respect to the first position of the camera module as a reference;

based on the plurality of aligned first images, obtaining a reference image by performing a weighted average operation on the plurality of aligned first images, wherein the reference image includes an image in which a strength of an original signal is increased in a high-frequency region and a strength of noise is reduced compared to the plurality of upscaled first images; and obtaining a second image using an artificial intelligence model based on the plurality of aligned first images and the reference image.

7. The method of claim 6, wherein the second image has a higher resolution than a resolution of the plurality of first images.

8. The method of claim 6, wherein the obtaining of the reference image comprises:
assigning a weight to each of the plurality of aligned first images based on a quality of each of the plurality of aligned first images, and
performing an operation of averaging the plurality of aligned first images based on the weight.

9. The method of claim 6, wherein the artificial intelligence model comprises a single frame super-resolution (SFSR) artificial intelligence model and a denoising artificial intelligence model.

10. The method of claim 6, wherein the obtaining of the reference image comprises obtaining the reference image using the artificial intelligence model.

* * * * *